United States Patent
Kitamura

(10) Patent No.: US 10,927,033 B2
(45) Date of Patent: Feb. 23, 2021

(54) OPTICAL FIBER PRODUCTION METHOD

(71) Applicant: FUJIKURA LTD., Tokyo (JP)

(72) Inventor: Takayuki Kitamura, Chiba (JP)

(73) Assignee: Fujikura Ltd., Tokyo (JP)

( * ) Notice: Subject to any disclaimer, the term of this patent is extended or adjusted under 35 U.S.C. 154(b) by 250 days.

(21) Appl. No.: 15/740,246

(22) PCT Filed: Nov. 28, 2016

(86) PCT No.: PCT/JP2016/085178
§ 371 (c)(1),
(2) Date: Dec. 27, 2017

(87) PCT Pub. No.: WO2017/158940
PCT Pub. Date: Sep. 21, 2017

(65) Prior Publication Data
US 2018/0186682 A1    Jul. 5, 2018

(30) Foreign Application Priority Data

Mar. 16, 2016   (JP) .............................. JP2016-052314

(51) Int. Cl.
*C03B 37/025* (2006.01)
*C03B 37/10* (2006.01)
(Continued)

(52) U.S. Cl.
CPC ...... *C03B 37/025* (2013.01); *C03B 37/02727* (2013.01); *C03B 37/10* (2013.01); *G02B 6/02* (2013.01); *C03B 2205/56* (2013.01)

(58) Field of Classification Search
CPC .. C03B 37/02–035; C03B 2205/55–56; C03B 37/02718; C03B 37/02727
See application file for complete search history.

(56) References Cited

U.S. PATENT DOCUMENTS 8,596,094 B2    12/2013   Duran et al.
2001/0006262 A1*  7/2001   Dubois ............... C03B 37/0235
                                                      264/1.24
(Continued)

FOREIGN PATENT DOCUMENTS

CN    104661975 A    5/2015
EP    2 899 168 A1   7/2015
(Continued)

OTHER PUBLICATIONS

Office Action issued in corresponding Japanese Patent Application No. 2016-052314 dated Jul. 11, 2017, with translation (6 pages).
(Continued)

*Primary Examiner* — Jason L Lazorcik
(74) *Attorney, Agent, or Firm* — Osha Bergman Watanabe & Burton LLP

(57) ABSTRACT

An optical fiber production method includes: drawing an optical fiber from an optical fiber preform; and cooling the optical fiber. When in the cooling process, the optical fiber is passed through a plurality of annealing furnaces and Equation (1) is held. A time constant of relaxation of a structure of glass forming a core in the optical fiber is $\tau(T_n)$. A temperature of the optical fiber at a point in time when the optical fiber is delivered into an nth annealing furnace from an upstream side is $T_n$. A fictive temperature of glass forming the core at the point in time when the optical fiber is delivered is $T_{fn}$. A fictive temperature of glass forming the core after a lapse of time $\Delta t$ from the point in time when the optical fiber is delivered is $T_f$.

$$20°\ C. < T_f - T_n = (T_{fn} - T_n)\exp(-\Delta t/\tau(T_n)) < 100°\ C. \quad (1)$$

5 Claims, 6 Drawing Sheets

(51) Int. Cl.
*G02B 6/02* (2006.01)
*C03B 37/027* (2006.01)

(56) References Cited

U.S. PATENT DOCUMENTS

| | | | | |
|---|---|---|---|---|
| 2002/0044753 | A1* | 4/2002 | Nagayama | C03B 37/029 385/123 |
| 2005/0259932 | A1* | 11/2005 | Nagayama | C03B 37/02718 385/123 |
| 2005/0281521 | A1* | 12/2005 | Oku | C03B 37/02727 385/123 |
| 2010/0162759 | A1* | 7/2010 | Duran | C03B 19/1453 65/41 |
| 2011/0092354 | A1 | 4/2011 | Duran et al. | |
| 2015/0251945 | A1* | 9/2015 | Nakanishi | C03B 37/0253 65/435 |

FOREIGN PATENT DOCUMENTS

| | | |
|---|---|---|
| JP | H06-024775 A | 2/1994 |
| JP | 2006-058494 A | 3/2006 |
| JP | 2007-238354 A | 9/2007 |
| JP | 2010-168247 A | 8/2010 |
| JP | 2014-062021 A | 4/2014 |

OTHER PUBLICATIONS

K. Saito, et. al., "Limit of the Rayleigh scattering loss in silica fiber", Applied Physics Letters, vol. 83, No. 25, Dec. 22, 2003, pp. 5175-5177 (3 pages).

K. Saito, et al., "Control of Glass-Forming Process During Fiber-Drawing to Reduce the Rayleigh Scattering Loss", Journal of the American Ceramic Society, vol. 89, No. 1, Jan. 2006, pp. 65-69 (5 pages).

Extended European Search Report in counterpart European Application No. 16894557.4 dated Jan. 30, 2019 (9 pages).

K. Tsujikawa et al; "Rayleigh Scattering Reduction Method for Silica-Based Optical Fiber"; Journal of Lightwave Technology, vol. 18, No. 11, pp. 1528-1532; Nov. 1, 2000 (5 pages).

* cited by examiner

OPTICAL FIBER PRODUCTION METHOD

TECHNICAL FIELD

The present invention relates to an optical fiber production method.

BACKGROUND

In optical fiber communication systems, in order to increase the reach and the rate of optical transmission, the optical signal-to-noise ratio has to be increased. Thus, a decrease in transmission losses in optical fibers is demanded. Nowadays, since an optical fiber production method is highly sophisticated, transmission losses caused by impurities contained in optical fibers are closed to the lower limits. A remaining main cause of transmission losses is scattering losses in association with fluctuations in the structure or composition of glass forming optical fibers. This is inevitable, because optical fibers are formed of glass.

As a method of decreasing fluctuations in the structure of glass, a method is known to cool molten glass slowly. As a method of slowly cooling molten glass, an attempt is made to slowly cool an optical fiber drawn from a drawing furnace immediately. Specifically, it is investigated to decrease the cooling rate of the optical fiber that an optical fiber drawn from a drawing furnace is heated in an annealing furnace, or an optical fiber drawn from a drawing furnace is surrounded by a heat insulator immediately.

Patent Literature 1 below discloses a method of setting the temperature of a heating furnace (an annealing furnace) is ±100° C. or less of the target temperature found by a recurrence formula in 70% or more of a region from a position at which the outer diameter of a silica based optical fiber having a core and a cladding becomes smaller than 500% of the final outer diameter to a position at which the temperature of the optical fiber is 1,400° C. Since the temperature history of the optical fiber is controlled in this manner, the fictive temperature of glass forming the optical fiber is decreased to reduce transmission losses.

[Patent Literature 1] JP2014-62021A

However, the technique disclosed in Patent Literature 1 above is required to repeat complex calculations in order to adjust the temperature of the optical fiber to an ideal temperature change found by the recurrence formula. The technique disclosed in Patent Literature 1 permits the temperature of the optical fiber to have a temperature shift of as large as ±50° C. to 100° C. with respect to the target temperature found by the recurrence formula. When the temperature shift of the optical fiber is permitted in such a large deviation, it is difficult to say that the temperature history is sufficiently optimized. For example, supposing that the temperature of the optical fiber slowly cooled is changed in a range of ±100° C., the fictive temperature of glass forming the optical fiber is also changed in a similar range, and only an optical fiber having a fictive temperature that is 100° C. higher than a fictive temperature reachable based on a target temperature found by the recurrence formula, transmission losses of the obtained optical fiber caused by light scattering are increased as large as by 0.007 dB/km. In such the disclosed production methods in which the temperature history of the optical fiber is not sufficiently optimized, capital investment is excessively spent for elongating the annealing furnace more than necessary, or productivity is degraded by decreasing the drawing rate more than necessary.

The transmission losses in the optical fiber caused by light scattering are reduced easily by appropriately setting the temperature of the annealing furnace and appropriately controlling the temperature difference between the fictive temperature of glass forming the optical fiber and the temperature of the optical fiber, because of promoting the relaxation of the structure of glass forming the optical fiber.

SUMMARY

One or more embodiments of the present invention provide an optical fiber production method that easily reduces transmission losses in the optical fiber.

An optical fiber production method according to one or more embodiments of the present invention includes: a drawing process of drawing an optical fiber from an optical fiber preform in a drawing furnace; and a slow cooling process of slowly cooling the optical fiber drawn in the drawing process. In the slow cooling process, the optical fiber is passed through a plurality of annealing furnaces. Equation (1) below is held in a given period in the slow cooling process, where a time constant of relaxation of a structure of glass forming a core included in the optical fiber is defined as $\tau(T_n)$, a temperature of the optical fiber at a point in time when the optical fiber is delivered into an nth annealing furnace from an upstream side in the slow cooling process is defined as $T_n$, a fictive temperature of glass forming the core at the point in time when the optical fiber is delivered is defined as $T_{fn}$, and a fictive temperature of glass forming the core after a lapse of time $\Delta t$ from the point in time when the optical fiber is delivered is defined as $T_f$.

$$20°\text{ C.} < T_f - T_n = (T_{fn} - T_n)\exp(-\Delta t/\tau(T_n)) < 100°\text{ C.} \tag{1}$$

The optical fiber is slowly cooled with the temperature difference between the temperature of the optical fiber and the fictive temperature of glass forming the core included in the optical fiber being controlled in the predetermined range and hence the relaxation of the structure of glass forming the core is promoted. With the promotion of the relaxation of the structure of glass forming the core, scattering losses caused by fluctuations in the structure of glass forming the core in the transmission of light through the core are reduced, and hence transmission losses in the optical fiber are reduced. As described above, the plurality of annealing furnaces is used in the slow cooling process, the preset temperatures of the annealing furnaces are appropriately controlled, and hence the temperature difference between the temperature of the optical fiber and the fictive temperature of glass forming the core included in the optical fiber is easily controlled in the predetermined range. As a result, the relaxation of the structure of glass forming the core is promoted, and transmission losses in the optical fiber are easily reduced.

In the optical fiber production method according to one or more embodiments of the present invention, Equation (2) below is held in a given period in the slow cooling process.

$$40°\text{ C.} < T_f - T_n = (T_{fn} - T_n)\exp(-\Delta t/\tau(T_n)) < 60°\text{ C.} \tag{2}$$

In this manner, in the slow cooling process, the temperature difference $(T_f - T_n)$ between the temperature $T_n$ of the optical fiber and the fictive temperature $T_f$ of glass forming the core included in the optical fiber is controlled in a more suitable range, and hence the relaxation of the structure of glass forming the core included in the optical fiber is more easily promoted, and transmission losses in the optical fiber are more easily reduced.

In the optical fiber production method according to one or more embodiments of the present invention, a relationship of Equation (3) below is held, where a preset temperature of the nth annealing furnace is defined as $T_{sn}$.

$$20° C. < T_{fn} - T_{sn} < 100° C. \qquad (3)$$

As described above, the plurality of annealing furnaces is used in the slow cooling process, the preset temperatures of the annealing furnaces are controlled in a predetermined range with respect to the fictive temperature of glass forming the core at the inlet ports of the annealing furnaces, and hence the temperature difference between the temperature of the optical fiber and the fictive temperature of glass forming the core included in the optical fiber is easily controlled in a predetermined range. As a result, the relaxation of the structure of glass forming the core is promoted, and transmission losses in the optical fiber are easily reduced.

In the optical fiber production method according to one or more embodiments of the present invention, Equation (4) below is held.

$$40° C. < T_{fn} - T_{sn} < 60° C. \qquad (4)$$

In this manner, the preset temperatures of the plurality of the annealing furnaces are individually controlled in a more suitable range, and hence the effect of promoting the relaxation of the structure of glass forming the core included in the optical fiber is easily increased, and transmission losses in the optical fiber are more easily reduced.

In the optical fiber production method according to one or more embodiments of the present invention, a temperature difference between a preset temperature and a fictive temperature of glass forming the core at an inlet port is smaller in the annealing furnace provided on a downstream side than in the annealing furnace provided on an upstream side.

When the temperature of glass becomes low, a small temperature difference between the fictive temperature of glass and the temperature of glass easily promotes the relaxation of the structure of glass. Thus, the temperature of the annealing furnace is set so that the temperature difference between the preset temperature and the fictive temperature of glass forming the core at the inlet port is smaller in the annealing furnace provided on the downstream side than in the annealing furnace provided on the upstream side. Thus, the relaxation of the structure of glass forming the core can be efficiently promoted. As a result, transmission losses in the optical fiber are more easily reduced.

The optical fiber is in any one of the plurality of annealing furnaces during at least a certain period for which a temperature of the optical fiber is in a range of 1,300° C. or more and 1,500° C. or less.

The optical fiber is slowly cooled when the temperature of the optical fiber is in this range, and hence the fictive temperature of glass forming the core included in the optical fiber is easily decreased for a shorter time, and transmission losses in the optical fiber are easily reduced.

As described above, according to one or more embodiments of the present invention, an optical fiber production method that easily reduces transmission losses in the optical fiber is provided.

DETAILED DESCRIPTION

In the following, embodiments of an optical fiber production method according to the present invention will be described in detail with reference to the drawings.

Figure 1:
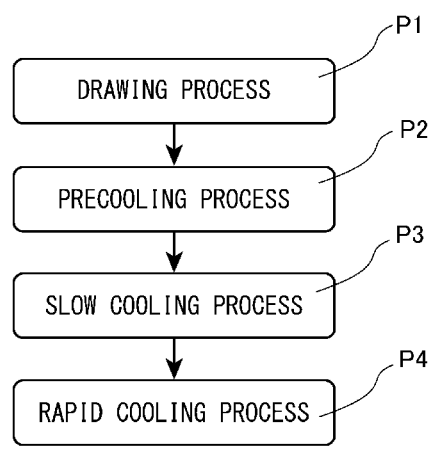
FIG. 1 is a flowchart of the processes of an optical fiber production method according to one or more embodiments of the present invention.
Figure 2:
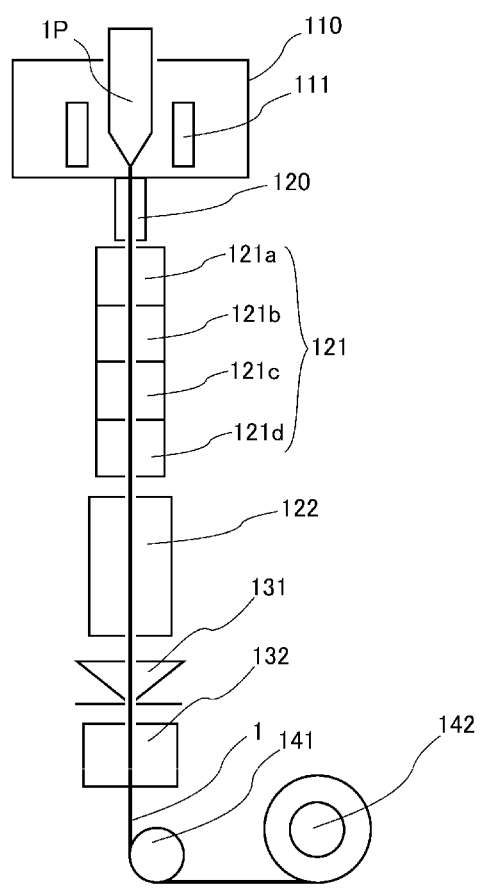
FIG. 2 is a schematic diagram of the configuration of devices for use in an optical fiber production method according to one or more embodiments of the present invention.

FIG. 1 is a flowchart of the processes of an optical fiber production method according to one or more embodiments of the present invention. As illustrated in FIG. 1, the optical fiber production method according to one or more embodiments includes a drawing process P1, a precooling process P2, a slow cooling process P3, and a rapid cooling process P4. In the following, these processes will be described. Note that, FIG. 2 is a schematic diagram of the configuration of devices for use in the optical fiber production method according to one or more embodiments.

<Drawing Process P1>

The drawing process P1 is a process in which one end of an optical fiber preform 12 is drawn in a drawing furnace 110. First, the optical fiber preform 1P is prepared. The optical fiber preform 1P is formed of glass having refractive index profiles the same as the refractive index profiles of a core and a cladding forming an optical fiber 1. The optical fiber 1 includes one or a plurality of cores and a cladding surrounding the outer circumferential surface of the core with no gap. The core and the cladding are formed of silica glass. The refractive index of the core is higher than the refractive index of the cladding. For example, in the case in which the core is formed of silica glass doped with a dopant, such as germanium, which increases the refractive index, the cladding is formed of pure silica glass. For example, in the case in which the core is formed of pure silica glass, the cladding is formed of silica glass doped with a dopant, such as fluorine, which decreases the refractive index.

Subsequently, the optical fiber preform 12 is suspended so that the longitudinal direction is perpendicular. The optical fiber preform 12 is disposed in the drawing furnace 110, a heating unit 111 is caused to generate heat, and then the lower end portion of the optical fiber preform 1P is heated. At this time, the lower end portion of the optical fiber preform 12 is heated at a temperature of 2,000° C., for example, to be molten. From the heated lower end portion of the optical fiber preform 1P, molten glass is drawn out of the drawing furnace 110 at a predetermined drawing rate.

<Precooling Process P2>

The precooling process P2 is a process in which the optical fiber drawn out of the drawing furnace 110 in the drawing process P1 is cooled to a predetermined temperature suitable for delivering the optical fiber into an annealing furnace 121, described later. A predetermined temperature of the optical fiber suitable for delivering the optical fiber into the annealing furnace 121 will be described later in detail.

In the optical fiber production method according to one or more embodiments, the precooling process P2 is performed by passing the optical fiber drawn in the drawing process P1 through the hollow portion of a tubular body 120 provided directly below the drawing furnace 110. The tubular body 120 is provided directly below the drawing furnace 110, causing the atmosphere in the inside of the hollow portion of the tubular body 120 to be almost the same as the atmosphere in the inside of the drawing furnace 110. Thus, a sudden change in the atmosphere and the temperature around the optical fiber immediately after drawn is reduced.

The temperature of the optical fiber to be delivered into the annealing furnace 121 is mainly determined by the drawing rate and the atmosphere in the drawing furnace 110. The precooling process P2 is provided, which further finely adjusts the cooling rate of the optical fiber for easy adjustment of the incoming temperature of the optical fiber to be delivered into the annealing furnace 121 to a suitable range. Based on the temperatures of the optical fiber drawn out of the drawing furnace 110 and suitable for delivering the optical fiber into the annealing furnace 121, the distance from the annealing furnace 121 to the drawing furnace 110 and the length of the tubular body 120 can be appropriately selected. The tubular body 120 is formed of a metal tube, for example. The cooling rate of the optical fiber may be adjusted by air-cooling the metal tube or by providing a heat insulator around the metal tube.

<Slow Cooling Process P3>

The slow cooling process P3 is a process in which the optical fiber, which is drawn out in the drawing process P1, is slowly cooled. In the optical fiber production method according to one or more embodiments, the temperature of the optical fiber is adjusted through the precooling process P2, and then the optical fiber is slowly cooled in the slow cooling process P3. In the slow cooling process P3, the optical fiber is passed through a plurality of annealing furnaces 121a, 121b, 121c, and 121d. In the description of the optical fiber production method according to one or more embodiments, in the case in which all the annealing furnaces are collectively referred or in the case in which it is unnecessary to distinguish between the annealing furnaces, they are sometimes simply referred to as "the annealing furnace 121". Note that, in FIG. 2, four annealing furnaces 121a, 121b, 121c, and 121d are shown. However, in one or more embodiments of the present invention, the number of the annealing furnaces is not limited specifically as long as the number is more than one. The presence of more than one annealing furnace means that there is a plurality of heat generating units whose temperatures can be set differently. For example, it can be said that a plurality of annealing furnaces is present when a plurality of heat generating units whose temperatures can be set differently is provided even though the heat generating units are housed in one enclosure.

The temperature in the inside of the annealing furnace 121 is a predetermined temperature different from the temperature of the optical fiber to be delivered into the annealing furnace 121. The cooling rate of the optical fiber is decreased by the temperature around the optical fiber delivered into the annealing furnace 121. The cooling rate of the optical fiber is decreased in the annealing furnace 121. Thus, the structure of glass forming the core included in the optical fiber is relaxed, and the optical fiber 1 with decreased scattering losses is obtained, as described below.

In the disclosed optical fiber production methods having the slow cooling process, the temperature of the optical fiber is not sufficiently optimized when the optical fiber is delivered into the annealing furnace. Specifically, the optical fiber is sometimes delivered into the annealing furnace with the temperature of the optical fiber being too high or too low. When the temperature of the optical fiber to be delivered into the annealing furnace is too high, the rate to relax the structure of glass forming the optical fiber is too fast, hardly expecting the effect of slowly cooling the optical fiber. On the other hand, when the temperature of the optical fiber to be delivered into the annealing furnace is too low, the rate to relax the structure of glass forming the optical fiber is decreased, sometimes causing a necessity to heat up again the optical fiber in the annealing furnace, for example. As described above, in the disclosed slow cooling processes, it is difficult to say that the relaxation of the structure of glass forming the optical fiber is efficiently performed. Thus, the annealing furnace is elongated more than necessary, which might demand an excessive capital investment, or the drawing rate is decreased more than necessary, which might degrade productivity.

According to the optical fiber production method of one or more embodiments, in the slow cooling process P3, the temperature of the annealing furnace 121 is appropriately set, the temperature difference between the fictive temperature of glass forming the core included in the optical fiber and the temperature of the optical fiber is appropriately controlled, and hence the relaxation of the structure of glass forming the core is promoted. As a result, the optical fiber 1 having decreased transmission losses can be obtained with no requirement of excessive capital investment and with excellent productivity. According to the optical fiber production method of one or more embodiments, complex calculation is unnecessary unlike the technique disclosed in Patent Literature 1 described above.

In silica glass classified as so-called strong glass, the time constant τ(T) of the structural relaxation, which is thought to correspond to the viscosity flow of glass, follows the Arrhenius equation. Thus, the time constant τ(T) is expressed as Equation (5) as a function of the temperature T of glass using a constant A and an activation energy $E_{act}$ determined by the composition of glass. Note that, $k_B$ is Boltzmann constant.

$$1/\tau(T)=A\cdot\exp(-E_{act}/k_B T) \quad (5)$$

(Here, T is absolute temperature of glass.)

Equation (5) above shows that the structure of glass is relaxed faster as the temperature of glass is higher and reached faster in the equilibrium state at the given temperature. That is, the fictive temperature of glass more quickly comes close to the temperature of glass faster as the temperature of glass is higher.

Figure 3:
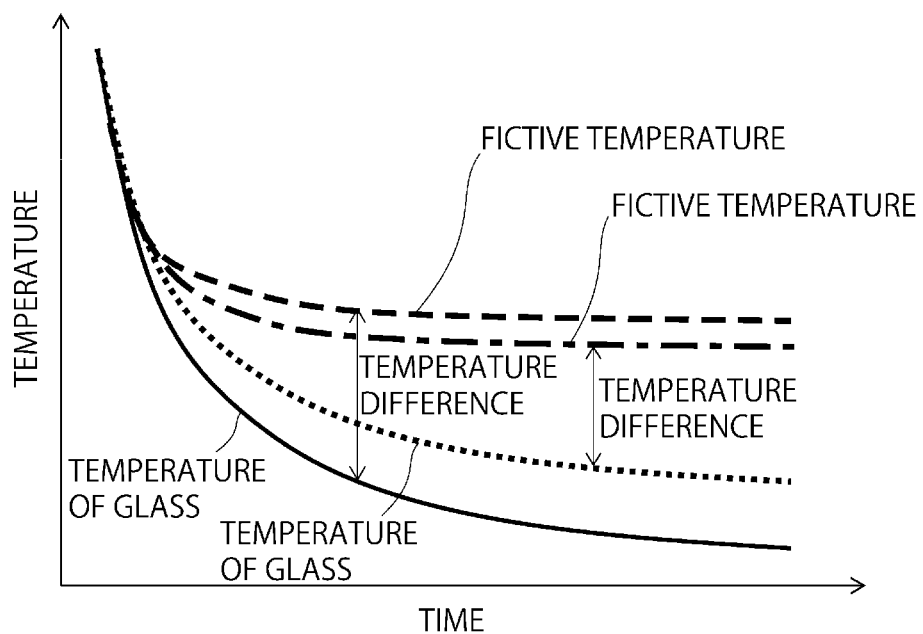
FIG. 3 is a graph of the relationship of the temperature of glass and the fictive temperature of the glass with slow cooling time according to one or more embodiments.

FIG. 3 shows the relationship of the temperature of glass and the fictive temperature of the glass with time in slowly cooling glass. In the graph of FIG. 3, the horizontal axis expresses time, and the vertical axis expresses temperature. In FIG. 3, a solid line expresses the transition of the temperature of glass under certain slow cooling conditions, and a broken line expresses the transition of the fictive temperature of glass at that time. A dotted line expresses the transition of the temperature of glass in the case in which the cooling rate is decreased more slowly than under the slow cooling conditions expressed by the solid line, and an alternate long and short dash line expresses the transition of the fictive temperature of glass at that time.

As expressed by the solid line and the broken line in FIG. 3, when the temperature of glass is decreased over a lapse of time in the high temperature area, the fictive temperature of glass is also similarly decreased. As described above, in the state in which the temperature of glass is sufficiently high, the rate of the relaxation of the structure of glass forming the optical fiber is very fast. However, as the temperature of glass is decreased, the rate of the relaxation of the structure of glass is decreased, and the fictive temperature of glass fails to follow a decrease in the temperature of glass after a while. The temperature difference between the temperature of glass and the fictive temperature of glass is then increased. Here, when the cooling rate of glass is slowed, the optical fiber is held in a relatively higher temperature state for a longer time, compared with the case in which the cooling rate is fast. Thus, as expressed by the dotted line and the alternate long and short dash line in FIG. 3, the temperature difference between the temperature of glass and the fictive temperature of glass becomes smaller, and the fictive temperature of glass is lower than the example described above. That is, when the cooling rate of glass is slowed, the relaxation of the structure of glass is easily promoted.

As described above, when the temperature of glass is high, the structure of glass is relaxed fast. However, the fictive temperature of glass does not reach to the below of the temperature of glass. Thus, when the temperature of glass is high, the fictive temperature of the glass also remains high. That is, when the temperature of glass is too high, the effects obtained by slow cooling are poor. From this viewpoint, the temperature of the optical fiber in the annealing furnace 121 is 1,600° C. or less or 1,500° C. or less. On the other hand, in the case in which the temperature of glass is low, the fictive temperature can be decreased to a lower temperature, but the decrease rate of the fictive temperature is slowed. That is, when the temperature of glass is too low, it will take longer time for slow cooling in order to sufficiently decrease the fictive temperature. From this viewpoint, the temperature of the optical fiber in the annealing furnace 121 is 1,300° C. or more or 1,400° C. or more. Therefore, the optical fiber stays in the annealing furnace 121 at least one period during which the temperature of the optical fiber is in a range of temperatures of 1,300° C. to 1,500° C., both inclusive. As described above, in the slow cooling process P3, the optical fiber is slowly cooled when the temperature of the optical fiber is in a predetermined range. Thus, the fictive temperature of glass forming the core included in the optical fiber is easily decreased for a shorter time, and transmission losses in the optical fiber are easily reduced.

Next, the following is the description in which the relaxation of the structure of glass forming the core is efficiently promoted to reduce transmission losses in the optical fiber by what manner of slowly cooling the optical fiber by means of the relationship between the temperature of glass and the fictive temperature of glass.

Under the conditions in which the time constant of the relaxation of the structure of glass forming the core included in the optical fiber is defined as $\tau(T)$, the temperature of the optical fiber at a certain point in time in the slow cooling process P3 is defined as T, and the fictive temperature of glass forming the core at that certain point in time is defined as $T_f^o$, the fictive temperature $T_f$ of glass forming the core after a lapse of time $\Delta t$ from the certain point in time is expressed as Equation (6) below based on Equation (5) above. Note that, $\Delta t$ is a short period of time, and the temperature of the optical fiber T for this period is supposed to be constant.

$$T_f - T = (T_f^o - T)\exp(-\Delta t/\tau(T)) \qquad (6)$$

Equation (6) above shows that the temperature difference $(T_f - T)$ between the fictive temperature $T_f$ of glass forming the core and the temperature T of the optical fiber depends on the temperature difference $(T_f^o - T)$ between the fictive temperature $T_f^o$ of glass forming the core and the temperature T of the optical fiber at a certain point in time as well as the fictive temperature $T_f$ of glass forming the core depends on the time constant $\tau(T)$ of the relaxation of the structure. The time constant $\tau(T)$ of the relaxation of the structure is defined as time until the temperature difference $(T_f - T)$ between the fictive temperature $T_f$ of glass and the temperature T of glass reaches 1/e when the temperature of glass whose fictive temperature is $T_f^o$ is T.

A change in the fictive temperature $T_f$ per unit time is greater as the temperature difference $(T_f^o - T)$ is greater to some extent.

Figure 4:
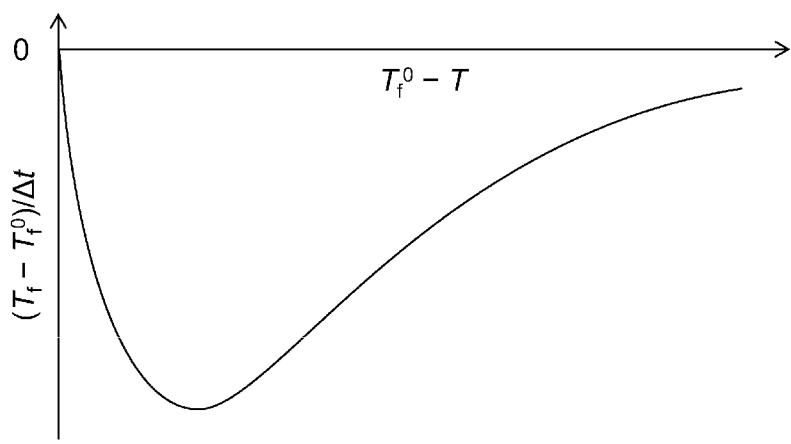
FIG. 4 is a graph schematically showing the relationship of the temperature difference $(T_f^o - T)$ between the fictive temperature of glass and the temperature of glass with the decrease rate $((T_f - T_f^o)/\Delta t)$ of the fictive temperature of glass per unit time according to one or more embodiments.

FIG. 4 schematically shows the relationship between the temperature difference $(T_f^o - T)$ where the temperature of the optical fiber including the core formed of glass whose fictive temperature is $T_f^o$ is T and a change $((T_f - T_f^o)/\Delta t)$ in the fictive temperature $T_f$ per unit time. As shown in FIG. 4, under the conditions in which the fictive temperature $T_f^o$ of glass forming the core coincides with the temperature T of the optical fiber $(T_f^o = T)$, the relaxation of the structure of glass forming the core does not occur, and a change in the fictive temperature per unit time is zero $((T_f - T_f^o)/\Delta t = 0)$. The conditions are thought in which the temperature T of the optical fiber is decreased from this point and the temperature difference $(T_f^o - T)$ between the fictive temperature $T_f^o$ of glass forming the core and the temperature T of the optical fiber is increased. Under the conditions, although the time constant $\tau(T)$ of the relaxation of the structure of glass forming the core is increased, the change rate of the fictive temperature $T_f$ per unit time $((T_f - T_f^o)/\Delta t)$ is negatively increased. However, the conditions are thought in which the temperature T of the optical fiber is further decreased and the temperature difference $(T_f^o - T)$ between the fictive temperature $T_f^o$ of glass forming the core and the temperature T of the optical fiber is further increased. Under the conditions, the time constant $\tau(T)$ of the relaxation of the structure of glass forming the core is now increased, and the absolute value of a change in the fictive temperature $T_f$ per unit time $((T_f - T_f^o)/\Delta t)$ is decreased. That is, FIG. 4 shows that as a downward peak expressed in the graph, a change in the fictive temperature per unit time $((T_f - T_f^o)/\Delta t)$ takes a minimum value when the temperature difference $(T_f^o - T)$ between the fictive temperature $T_f^o$ of glass forming the core and the temperature T of the optical fiber is a certain value.

Here, solving Equation (6) above shows that the relationship of Equation (7) below is held between the temperature T of glass and the fictive temperature $T_f$ when the decrease rate of the fictive temperature $T_f$ of glass is the maximum.

$$T^2 + (E_{act}/k_B) \times T - (E_{act}/k_B) \times T_f = 0 \qquad (7)$$

When Equation (7) above is further solved on T as Equation (8) below, the temperature T of glass can be found, at which the fictive temperature $T_f$ of glass can be most efficiently decreased. In the following, the temperature of glass, at which the fictive temperature $T_f$ of glass can be most efficiently decreased, is sometimes referred to as "the optimized temperature of glass", and the fictive temperature that has been most efficiently decreased is sometimes referred to as "the optimized fictive temperature".

$$T = \frac{-\frac{E_{act}}{k_B} + \sqrt{\left(\frac{E_{act}}{k_B}\right)^2 + 4\frac{E_{act}}{k_B}T_f}}{2} \qquad (8)$$

As described so far, when the temperature difference $(T_f^0-T)$ between the fictive temperature $T_f^0$ of glass and the temperature T of glass at a certain point in time is a predetermined value, a change in the fictive temperature $T_f$ of glass per unit time is maximized. That is, when the fictive temperature $T_f$ after a lapse of a certain time Δt of glass having the fictive temperature $T_f^0$ is thought, the temperature T of glass is present, at which fictive temperature $T_f$ can be minimum value.

Figure 5:
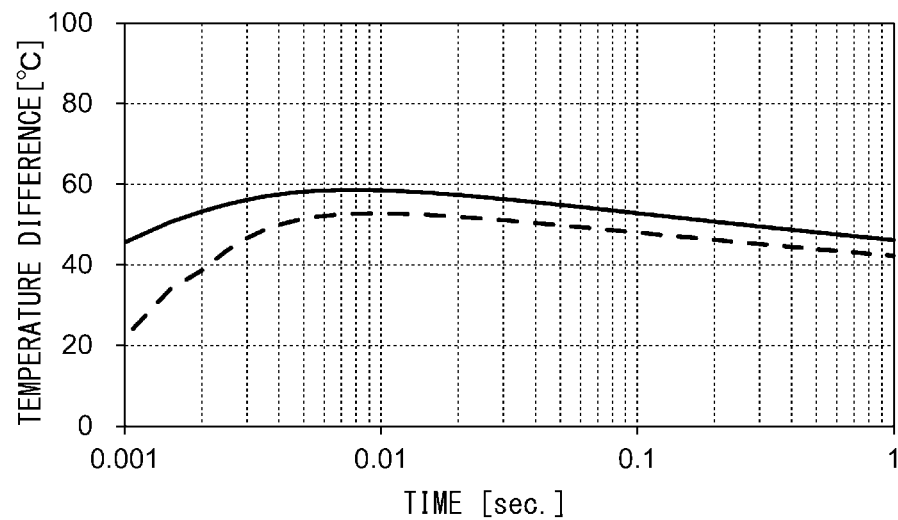
FIG. 5 is a graph of a temporal change in the temperature difference between the fictive temperature of glass and the temperature of glass according to one or more embodiments.

On a standard single-mode optical fiber having a core doped with $G_eO_2$, a variation over time of the temperature difference $(T_f-T)$ between the value where the fictive temperature $T_f$ of glass forming the core, which is found from Equation (6) above, takes the lowest value and the temperature T of the optical fiber at that value. Here, it is supposed that the slow cooling process P3 is performed immediately after the optical fiber preform is heated and molten in the drawing process P1. Supposing that a temperature $T^0$ of the optical fiber is 1,800° C. at the beginning of slow cooling, at which slow cooling time is zero second, time required for relaxing the structure of glass forming the core at this temperature is as very short as less than 0.001 second. Thus, it can be thought that the fictive temperature $T_f^0$ of glass forming the core at the beginning of slow cooling is also 1,800° C. That is, the initial value is assumed as $T_f^0-T^0=0°$ C. For the constant A and the activation energy $E_{act}$ in Equations (5) and (7) above, values described in Non-Patent Literature 1 (K. Saito, et al., Journal of the American Ceramic Society, Vol. 89, pp. 65-69 (2006)), and Non-Patent Literature 2 (K. Saito, et al., Applied Physics Letters, Vol. 83, pp. 5175-5177 (2003)) are adopted, and Δt is calculated as 0.0005 second. These results are shown in FIG. 5. In the graph shown in FIG. 5, the vertical axis expresses the temperature difference $(T_f-T)$ between the fictive temperature $T_f$ of glass forming the core and the temperature T of the optical fiber at that fictive temperature $T_f$, and the horizontal axis expresses the slow cooling time of the optical fiber. In FIG. 5, a solid line expresses the result using the constant A and the activation energy $E_{act}$ described in Non-Patent Literature 1, and a broken line expresses the result using the constant A and the activation energy $E_{act}$ described in Non-Patent Literature 2. Under these conditions, the fictive temperature of glass forming the core where slow cooling time is 0.5 second is found as temperatures of 1,390° C. and 1,322° C.

Regarding the variation over time of the temperature difference $(T_f-T)$ between the fictive temperature of glass forming the core and the temperature of the optical fiber derived from the assumption, it is shown that in the time domain from the beginning of slow cooling up to about 0.01 second, the temperature difference $(T_f-T)$ has to be gradually increased, whereas in the time domain from about 0.01 second and later after the beginning of slow cooling, the temperature difference $(T_f-T)$ has to be gradually decreased. It is shown that in all the time domains, the temperature difference $(T_f-T)$ has to be less than about 60° C., the temperature T of the optical fiber is controlled so that in almost all the time domains, the temperature difference $(T_f-T)$ is kept higher than about 40° C. and less than about 60° C., and hence the fictive temperature $T_f$ of glass forming the core is efficiently decreased. Time at which the temperature difference $(T_f-T)$ shown in FIG. 5 is the maximum, is about 0.01 second, although the time is varied more or less depending on the constant A and the activation energy $E_{act}$ in Equation (5) above, and the temperature $T^0$ of the optical fiber and the fictive temperature $T_f^0$ of glass forming the core at the beginning of slow cooling, at which slow cooling time is zero second.

In the time domain from the beginning of slow cooling to 0.01 second where the temperature difference $(T_f-T)$ observed here is reached at about 60° C., the temperature conditions are the conditions shown on the left side of the minimum value of a change in the fictive temperature per unit time $((T_f-T_f^0/Δt))$ shown in the graph in FIG. 4. Thus, in the case in which slow cooling is started under the condition $T_f^0-T^0=0°$ C. as described above, it is thought that the relaxation of the structure due to slow cooling is not efficiently performed. Therefore, it was assumed that the precooling process P2 is provided before the slow cooling process P3, precooling is performed so that the temperature difference $(T_f-T)$ is about 60° C. in the precooling process P2, and then the slow cooling process P3 is performed.

Figure 6:
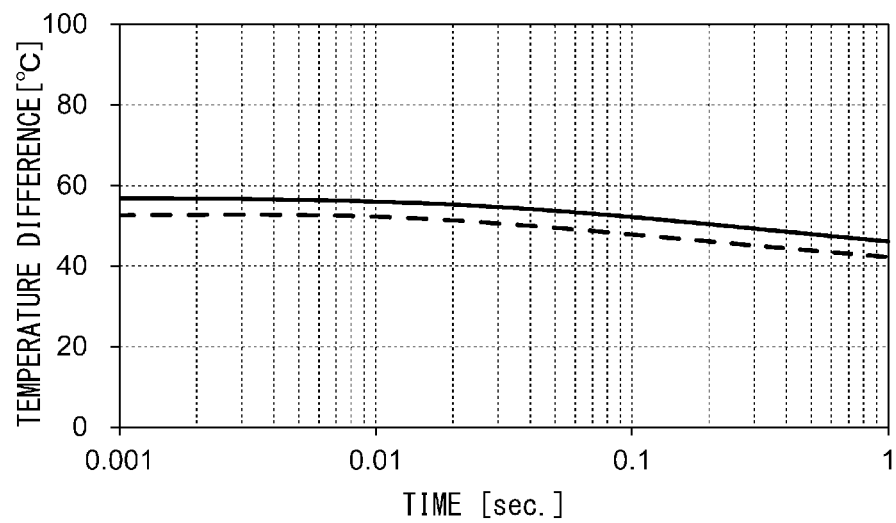
FIG. 6 is a graph of a temporal change in the temperature difference between the fictive temperature of glass and the temperature of glass under the initial conditions different from those in FIG. 5.

Therefore, initial values where $T_f^0-T^0=60°$ C. are assumed for further investigation. That is, initial values are assumed where the temperature $T^0$ of the optical fiber at the beginning of slow cooling, at which slow cooling time is zero second, is 1,500° C., and the fictive temperature $T_f^0$ of glass forming the core at this time is 1,560° C. Similarly to the results shown in FIG. 5, FIG. 6 shows a variation over time of the temperature difference $(T_f-T)$ between the value where the fictive temperature $T_f$ of glass forming the core takes the lowest value and the temperature T of the optical fiber at that value. In the graph in FIG. 6, the vertical axis expresses the temperature difference $(T_f-T)$ between the value where the fictive temperature $T_f$ of glass forming the core takes the lowest value and the temperature T of the optical fiber at that value, and the horizontal axis expresses the slow cooling time of the optical fiber. A solid line expresses the result using the constant A and the activation energy $E_{act}$ described in Non-Patent Literature 1, and a broken line expresses the result using the constant A and the activation energy $E_{act}$ described in Non-Patent Literature 2. As illustrated in FIG. 6, it is shown that the temperature difference $(T_f-T)$ is monotonously decreased in all the time domains and the temperature T of the optical fiber is maintained in a range suitable for a decrease in the fictive temperature $T_f$ of glass forming the core. Under these conditions, the fictive temperature of glass forming the core where slow cooling time is 0.5 second is derived as temperatures of 1,387° C. and 1,321° C., and the fictive temperature of glass forming the core can be decreased more than the fictive temperature under the conditions shown in FIG. 5.

Figure 7:
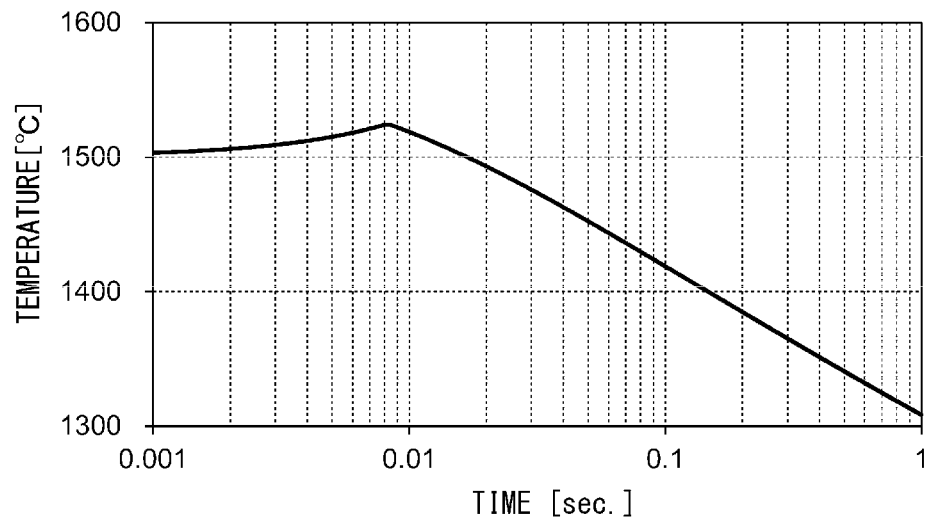
FIG. 7 is a graph of a temporal change in the temperature of glass under the initial conditions different from those in FIGS. 5 and 6.

Subsequently, under the condition $T_f^0-T^0=120°$ C., initial values are assumed where the temperature difference between the fictive temperature $T_f$ of glass forming the core and the temperature T of the optical fiber is large for further investigation. That is, initial values are assumed where the temperature $T^0$ of the optical fiber at the beginning of slow cooling, at which slow cooling time is zero second, is 1,500° C., and the fictive temperature $T_f^0$ of glass forming the core at this time is 1,620° C. FIG. 7 shows the variation over time of the temperature T of the optical fiber when the fictive temperature $T_f$ of glass forming the core takes the lowest value. The values described in Non-Patent Literature 1 were used for the constant A and the activation energy $E_{act}$. In the case in which the initial temperature difference $(T_f-T)$ is large, the temperature conditions are the conditions shown on the right side of the minimum value of a change in the fictive temperature per unit time $((T_f-T_f^0)/\Delta t)$ shown in the graph in FIG. 4. That is, in the case in which the fictive temperature $T_f$ of glass forming the core is higher with respect to the temperature T of the optical fiber, the temperature T of the optical fiber is increased and brought close to the fictive temperature $T_f$ to decrease the temperature difference $(T_f-T)$, which accelerates the relaxation of the structure. Thus, FIG. 7 shows that the temperature T of the optical fiber is temporarily increased from the beginning of slow cooling up to about 0.01 second. After the temperature difference $(T_f-T)$ is reached at an appropriate level, the temperature T of the optical fiber is monotonously decreased similarly in FIG. 6. As described above, in the case in which the temperature difference $(T_f-T)$ in the initial slow cooling is large, the optical fiber once cooled has to be again heated up after the optical fiber is delivered into the annealing furnace. Thus, the optical fiber is uselessly heated, resulting in insufficient slow cooling within the duration of the optical fiber in the annealing furnace. Under these conditions, the fictive temperature of glass forming the core where slow cooling time is 0.5 second is derived as 1,389° C. Although the fictive temperature of glass forming the core can be decreased more than under the conditions shown in FIG. 5, the fictive temperature is inferior to that under the conditions shown in FIG. 6.

The assumptions show that the precooling process P2 is provided subsequent to the drawing process P1 so that the temperature difference $(T_f-T)$ between the fictive temperature of glass forming the core and the temperature of the optical fiber is reached at an appropriate level and then the slow cooling process P3 is performed, which allows the efficient relaxation of the structure of glass forming the core with the advantageous use of the duration of the optical fiber in the annealing furnace. That is, the precooling process P2 is performed until the temperature difference $(T_f-T)$ between the fictive temperature of glass forming the core and the temperature of the optical fiber is reached at about 60° C., and then the slow cooling process P3 is started, which allows the advantageous use of the duration of the optical fiber in the annealing furnace.

The results shown in FIGS. 5 and 6 reveal the following. That is, even though slight differences are present in the values of the constant A and the activation energy $E_{act}$ determined based on the composition of glass, it is revealed that when the temperature difference $(T_f-T)$ between the fictive temperature of glass and the temperature of glass is about 60° C. at the point in time at which the slow cooling process P3 is started, the fictive temperature of glass is efficiently decreased. Thus, in so-called typical optical fibers in which the concentration of dopant is low and its principal component is silica glass, slow cooling of the optical fiber is started under the conditions in which the temperature difference $(T_f-T)$ between the fictive temperature of glass forming the optical fiber and the temperature of the optical fiber is about 60° C., and hence the fictive temperature of glass forming the optical fiber is efficiently decreased. For example, also in cores made of silica glass doped with a dopant, such as $G_eO_2$, and claddings substantially made of pure silica glass, or in cores substantially made of pure silica glass and claddings made of silica glass doped with a dopant, such as fluorine, the fictive temperature is efficiently decreased.

According to the optical fiber production method of one or more embodiments, the plurality of the annealing furnaces 121 is used in a period from the start to the end of the slow cooling process P3, and the optical fiber is in turn delivered into the annealing furnaces 121 with the temperature T being gradually decreased. From the results shown in FIGS. 5 and 6, the temperature difference $(T_f-T)$ between the temperature of the optical fiber and the fictive temperature of glass forming the core included in the optical fiber when the relaxation of the structure is efficiently caused by slow cooling is monotonously decreased with a lapse of slow cooling time. That is, when the time constant of the relaxation of the structure of glass forming the core is defined as $\tau(T)$, the temperature of the optical fiber at a certain point in time in the slow cooling process P3 is defined as T, the fictive temperature of glass forming the core at the certain point in time is defined as $T_f^0$, and the fictive temperature of glass forming the core after a lapse of time $\Delta t$ from the certain point in time is defined as $T_f$, Equation (2') below is held.

$$40° C.<T_f-T=(T_f^0-T)\exp(-\Delta t/\tau(T))<60° C. \qquad (2)$$

Therefore, in the slow cooling process P3, the temperature of the optical fiber at a point in time when the optical fiber is delivered into the nth annealing furnace 121 from the upstream side is defined as $T_n$, the fictive temperature of glass forming the core at the point in time when the optical fiber is delivered into the annealing furnace is defined as $T_{fn}$, and the fictive temperature of glass forming the core after a lapse of time $\Delta t$ from the point in time when the optical fiber is delivered into the annealing furnace is defined as $T_f$, Equation (2) below is held.

$$40° C.<T_f-T_n=(T_{fn}-T_n)\exp(-\Delta t/\tau(T_n))<60° C. \qquad (2)$$

In the case in which the plurality of the annealing furnaces 121 is used in the slow cooling process P3 in this manner, the preset temperatures of the annealing furnaces 121 are appropriately controlled, and hence the temperature difference $(T_f-T)$ between the temperature T of the optical fiber when delivered into each of the annealing furnaces 121 and the fictive temperature $T_f$ of glass forming the core included in the optical fiber is controlled in the predetermined range, and the relaxation of the structure of glass forming the core included in the optical fiber is more easily promoted. Thus, transmission losses in the optical fiber are easily reduced.

Note that, the conditions for the temperature difference $(T_f-T)$ between the temperature T of the optical fiber and the fictive temperature $T_f$ of glass forming the core included in the optical fiber in order to most efficiently decrease the fictive temperature $T_f$ of glass forming the core are as described above. However, transmission losses in the optical fiber can also be sufficiently reduced under the conditions described below.

The fictive temperature $T_f$ of glass forming the core included in the optical fiber can be tied to transmission losses in the optical fiber by a relational expression below. A Rayleigh scattering coefficient $R_r$ is proportional to the fictive temperature $T_f$ of glass forming the core, and a transmission loss $\alpha_T$ caused by Rayleigh scattering is expressed by Equation (9) below where the wavelength of light to be transmitted is $\lambda$ (μm).

$$\alpha_T = R_s/\lambda^4 = BT_f/\lambda^4 \quad (9)$$

Here, based on Non-Patent Literature 2 above, B=4.0×10$^{-4}$ dB/km/μm$^4$/K. Let us consider a transmission loss at the wavelength $\lambda$=1.55 μm. When the fictive temperature $T_f$ of glass forming the core is increased by 14° C., the Rayleigh transmission loss $\alpha_T$ caused by Rayleigh scattering is increased by about 0.001 dB/km. That is, when errors from the optimized fictive temperature $T_f$ can be restricted less than 14° C., an increase in the Rayleigh transmission loss $\alpha_T$ caused by Rayleigh scattering can be controlled to less than 0.001 dB/km.

As described above, in the case of taking into account of permissive errors based on the fictive temperature $T_f$ of glass forming the core, at which the fictive temperature $T_f$ is most efficiently decreased, the optical fiber only has to be delivered into the annealing furnace 121 under the temperature conditions in which the temperature difference $(T_f-T)$ between the fictive temperature $T_f$ of glass forming the core and the temperature of the optical fiber is higher than about 20° C. and lower than about 100° C. as described below.

Figure 8:
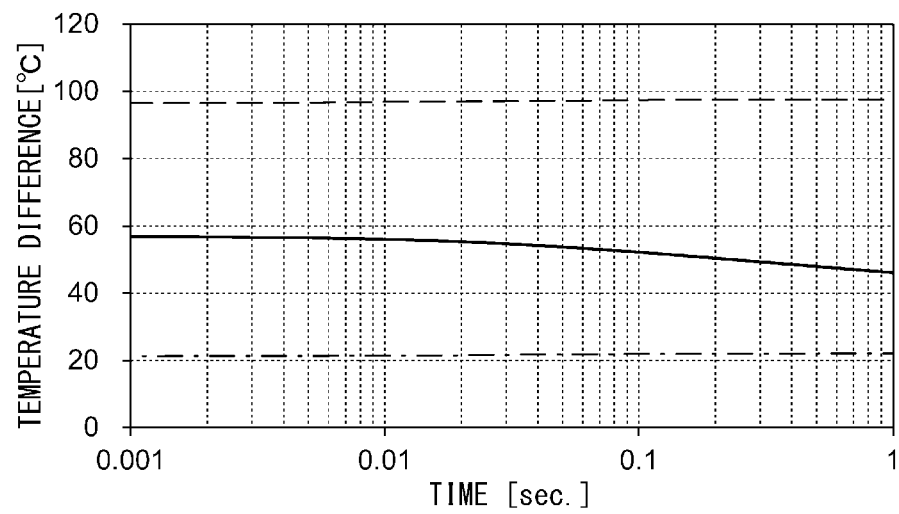
FIG. 8 is a graph of the upper limit and the lower limit of the variation over time in the optimized temperature difference $(T_f - T)$ depicted by a solid line in FIG. 6 and the temperature difference $(T_f - T)$ in which a transmission loss caused by scattering is not increased by 0.001 dB/km or more.

The temperature difference $(T_f-T)$, at which an increase in the scattering loss expected from the fictive temperature $T_f$ of glass forming the core when the optical fiber is slowly cooled for 0.5 second at the temperature difference $(T_f-T)$ expressed by the solid line in FIG. 6 can be restricted to less than 0.001 dB/km, can be predicted from Recurrence formula (6) above. Similarly to the assumption shown in FIG. 6, it is assumed that the fictive temperature $T_f^0$ of glass forming the core of the optical fiber at the beginning of slow cooling, at which slow cooling time is zero second, is 1,560° C., and the temperature difference $(T_f-T)$ is almost constant during the slow cooling process P3. Recurrence formula (6) is solved using the values described in Non-Patent Literature 1 above for the constant A and the activation energy $E_{act}$, and then a graph shown in FIG. 8 is obtained. In FIG. 8, a broken line expresses the upper limit of the variation over time of the temperature difference $(T_f-T)$ in the case in which the amount of an increase in a transmission loss expressed from the fictive temperature $T_f$ of glass forming the core when the optical fiber is slowly cooled for 0.5 second at the temperature difference $(T_f-T)$ expressed by the solid line in FIG. 6 is 0.001 dB/km or less, and an alternate long and short dash line expresses the lower limit. In FIG. 8, the temperature difference $(T_f-T)$ expressed by the solid line in FIG. 6 is again expressed by a solid line.

The result shown in FIG. 8 reveals the following. When the temperature of the annealing furnace 121 only has to be set so as to control the temperature history of the optical fiber in which the temperature difference $(T_f-T)$ is in a range of above about 20° C. and less than about 100° C. during the slow cooling process P3, an increase in the fictive temperature of glass forming the core is restricted up to a rise of about 14° C. with respect to the optimized fictive temperature $T_f$. As a result, an increase can be restricted to an increase of 0.001 dB/km or less with respect to the values under the optimized conditions under which transmission losses are most decreased.

Thus, the temperature difference $(T_f-T)$ between the temperature T of the optical fiber and the fictive temperature $T_f$ of glass forming the core included in the optical fiber is maintained in a range of above about 20° C. and less than about 100° C. also in a given period from the start to the end of the slow cooling process P3, and hence the relaxation of the structure of glass forming the core included in the optical fiber is easily promoted, and transmission losses in the optical fiber are easily reduced. That is, Equation (1') below is held.

$$20°\ C. < T_f - T = (T_f^0 - T)\exp(-\Delta t/\tau(T)) < 100°\ C. \quad (1')$$

Therefore, in the slow cooling process P3, the temperature of the optical fiber at a point in time when the optical fiber is delivered into the nth annealing furnace from the upstream side is defined as $T_n$, the fictive temperature of glass forming the core at the point in time when the optical fiber is delivered into the annealing furnace is defined as $T_{fn}$, and the fictive temperature of glass forming the core after a lapse of time from the point in time when the optical fiber is delivered into the annealing furnace is defined as $T_f$, Equation (1) below is held.

$$20°\ C. < T_f - T_n = (T_{fn} - T_n)\exp(-\Delta t/\tau(T_n)) < 100°\ C. \quad (1)$$

That is, the optical fiber only has to be delivered into the annealing furnace 121 under the temperature conditions in which the temperature difference $(T_f-T)$ between the fictive temperature $T_f$ of glass forming the core and the temperature of the optical fiber is higher than about 20° C. and lower than about 100° C.

Next, a specific example for easily satisfying the conditions of Equation (2) or (1) above will be described. In the optical fiber production method according to one or more embodiments, four annealing furnaces 121a, 121b, 121c, and 121d are used in the slow cooling process P3. The plurality of the annealing furnaces 121 is used in this manner, and hence the temperature difference between the temperature of the optical fiber and the fictive temperature of glass forming the core is easily controlled in a predetermined range. That is, in the slow cooling process P3, when the optical fiber is passed through the plurality of the annealing furnaces 121 and the preset temperature of the nth annealing furnace 121 from the upstream side is defined as $T_{sn}$, the relationship of Equation (3) below is to be held.

$$20°\ C. < T_{fn} - T_{sn} < 100°\ C. \quad (3)$$

Figure 9:
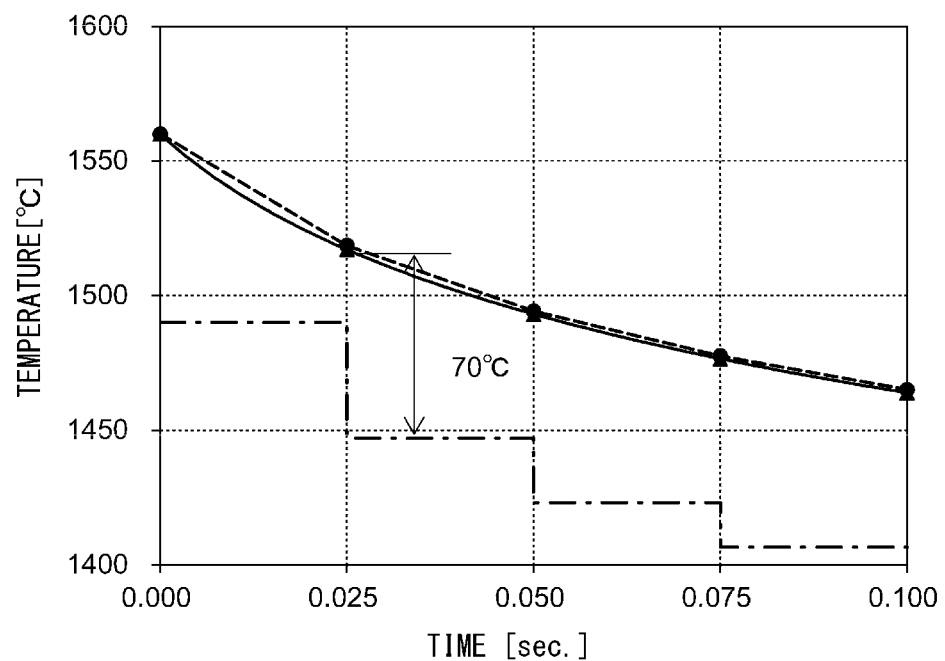
FIG. 9 is a graph of the preset temperatures of annealing furnaces, the optimized fictive temperature of glass at the inlet ports of the annealing furnaces, and the fictive temperature of glass through the fictive temperature history at the inlet ports of the annealing furnaces according to one or more embodiments.

As described above, the optical fiber is slowly cooled with the temperature difference $(T_f-T)$ between the temperature of the optical fiber and the fictive temperature of glass forming the core included in the optical fiber being controlled in a predetermined range, and hence the relaxation of the structure of glass forming the core is promoted. With the promotion of the relaxation of the structure of glass forming the core, scattering losses caused by fluctuations in the structure of glass forming the core in the transmission of light through the core are reduced, and hence transmission losses in the optical fiber are reduced. As described above, in the slow cooling process P3, the plurality of the annealing furnaces 121 is used, and the preset temperatures of the annealing furnaces 121 is controlled in a predetermined range with respect to the fictive temperature of glass forming the core in slow cooling time until which the optical fiber is reached at the inlet port of each of the annealing furnaces 121, and hence the temperature difference between the temperature of the optical fiber and the fictive temperature of glass forming the core included in the optical fiber is easily controlled in a predetermined range. As a result, the relaxation of the structure of glass forming the core is promoted, and transmission losses in the optical fiber are reduced. Referring to FIG. 9, this will be described more in detail below.

FIG. 9 shows a change in the optimized fictive temperature of glass forming the core (a solid line) calculated from Equation (5) when assuming initial values where the temperature T° of the optical fiber is 1,500° C. and the fictive temperature $T_f^o$ of glass forming the core at this time is 1,560° C., the preset temperatures of the annealing furnaces 121a, 121b, 121c, and 121d (an alternate long and short dash line), and the expected fictive temperature of glass forming the core in slow cooling time until which the optical fiber is reached at the inlet ports or the outlet ports of the annealing furnaces 121a, 121b, 121c, and 121d. In the example shown in FIG. 9, it is assumed that the lengths of the annealing furnaces 121 are each 0.5 m and the drawing rate is 20 m/second.

As shown by solid triangles in FIG. 9, the optimized fictive temperature $T_f$ of glass forming the core when the optical fiber is delivered into each of the annealing furnaces 121 and when the optical fiber is delivered out of the most downstream annealing furnace 121d, i.e. when the slow cooling time is 0.000 second, 0.025 second, 0.050 second, 0.075 second, and 0.100 second, the optimized fictive temperature $T_f$ is calculated as temperatures of 1,560° C., 1,517° C., 1,493° C., 1,477° C., and 1,464° C., respectively. The preset temperatures of the annealing furnaces 121a, 121b, 121c, and 121d are then set as expressed by the alternate long and short dash line in FIG. 9. That is, the temperatures of the annealing furnaces 121 are set to a temperature lower than the optimized fictive temperature $T_f$ of glass forming the core at the slow cooling time at which the optical fiber is reached at the inlet port of each of the annealing furnaces 121 by 70° C. As a result, since the temperature of the optical fiber is close to the preset temperatures of the annealing furnaces 121 near the outlet ports of the annealing furnaces 121, the temperature difference ($T_f$-T) between the fictive temperature of glass and the temperature of the optical fiber at that fictive temperature is further deceased near the outlet ports of the annealing furnaces 121. With the sudden change in the temperature of glass forming the optical fiber delivered into the annealing furnaces 121, which is immediately almost comparable with the preset temperatures of the annealing furnaces 121, the temperature of the glass temporarily deviates from the conditions of Equation (1). The glass through such fictive temperature history is expected to have the fictive temperatures expressed by solid circles in FIG. 9.

Since the actual temperature of glass is more gently decreased and close to the preset temperature of the annealing furnace, the actual fictive temperature is slightly higher than optimized fictive temperatures expressed by the solid triangles and slightly lower than the fictive temperatures expressed by the solid circles. However, this is errors in a tolerable range. In the example shown in FIG. 9, the temperature difference between the fictive temperature of glass through a fictive temperature history after slow cooling for 0.100 second and the optimized fictive temperature is 1.1° C., which the different in the scattering loss is only less than 0.001 dB/km.

Based on the viewpoint described above, from the viewpoint of controlling the temperature difference between the temperature of the optical fiber and the fictive temperature of glass forming the core in a more appropriate range, i.e. from the viewpoint of easily satisfying Equation (2) above, Equation (4) below is held.

$$40° C. < T_{fn} - T_{sn} < 60° C. \quad (4)$$

In this manner, the preset temperature of the annealing furnace 121 is controlled in a more appropriate range, and hence the effect of promoting the relaxation of the structure of glass forming the core included in the optical fiber is easily increased, and transmission losses in the optical fiber are easily reduced.

As illustrated in FIGS. 5 and 6, when the temperature of glass becomes low, a small temperature difference between the fictive temperature of glass and the temperature of glass easily promotes the relaxation of the structure of glass. Thus, the temperature difference between the preset temperature and the fictive temperature of glass forming the core at the inlet port is smaller in the annealing furnace 121 provided on the downstream side than in the annealing furnace 121 provided on the upstream side. For example, as expressed by the solid line in FIG. 6, the temperature difference between the optimized temperature of glass and the optimized fictive temperature of glass forming the core at slow cooling time of 0.025 second, 0.050 second, 0.075 second, and 0.100 second is temperatures of 55° C., 54° C., 53° C., and 52° C., respectively. The temperature difference is smaller toward the downstream side. As described above, the temperature of the annealing furnace is set so that the temperature difference between the preset temperature and the fictive temperature of glass forming the core at the inlet port is smaller in the annealing furnace provided on the downstream side than in the annealing furnace provided on the upstream side. Thus, the relaxation of the structure of glass forming the core can be efficiently promoted. As a result, transmission losses in the optical fiber are more easily reduced.

Note that, the relationship between the temperature T of the optical fiber and the fictive temperature $T_f$ of glass forming the core depends solely on the slow cooling time t when the composition of the optical fiber is the same, and the slow cooling time t, the length L of the annealing furnace, and the drawing rate v can be correlated with one another based on the relationship of Equation (10) below.

$$t = L/v \quad (10)$$

Therefore, when the targeted fictive temperature $T_f$ of glass forming the core included in the optical fiber to be manufactured is set and the drawing rate v taking into account of productivity is determined, a necessary length L of the annealing furnace is derived. For example, the slow cooling time t needs about 0.1 second to set the fictive temperature $T_f$ to 1,500° C. Thus, it is revealed that in the case in which the drawing rate v is set to 20 m/second, the length L of the annealing furnace needs two meters. For example, the slow cooling time t needs about 0.4 second in order to set the fictive temperature $T_f$ to 1,400° C., for example. Thus, it is revealed that in the case in which the drawing rate v is set to 10 m/second, the length L of the annealing furnace needs four meters. On the other hand, when the length L of the annealing furnace has only two meters, it is revealed that it is necessary to set the drawing rate v to 5 m/second. However, from the viewpoint of productivity, for example, the drawing rate v is selected in a range of about 10 to 50 m/second, the length L of the annealing furnace is selected in a range of about one to ten meters, and the slow cooling time t is one second or less.

<Rapid Cooling Process P4>

After the slow cooling process P3, the optical fiber is covered with a coating layer to enhance the resistance against external flaws, for example. Typically, this coating layer is formed of an ultraviolet curable resin. In order to form such a coating layer, it is necessary to sufficiently cool the optical fiber at a low temperature for preventing the coating layer from being burn, for example. The temperature of the optical fiber affects the viscosity of a resin to be applied, and as a result, this affects the thickness of the coating layer. A suitable temperature of the optical fiber in forming the coating layer is appropriately determined suitable for the properties of a resin forming the coating layer.

In the optical fiber production method according to one or more embodiments, since the annealing furnace 121 is provided between the drawing furnace 110 and a coater 131, the section for sufficiently cooling the optical fiber is decreased. More specifically, the optical fiber production method according to one or more embodiments also includes the precooling process P2, further decreasing the section sufficiently cooling the optical fiber. Thus, the optical fiber production method according to one or more embodiments includes the rapid cooling process P4 in which the optical fiber delivered out of the annealing furnace 121 is rapidly cooled using a cooling device 122. In the rapid cooling process P4, the optical fiber is rapidly cooled faster than in the slow cooling process P3. Since the rapid cooling process P4 performed in this manner is provided the temperature of the optical fiber can be sufficiently decreased in a shorter section, easily forming the coating layer. The temperature of the optical fiber when it is delivered out of the cooling device 122 is in a range of temperatures of 40° C. to 50° C., for example.

As described above, the optical fiber, which has been passed through the cooling device 122 and cooled to a predetermined temperature, is passed through a coater 131 containing an ultraviolet curable resin to be the coating layer that covers the optical fiber, and the optical fiber is covered with this ultraviolet curable resin. The optical fiber is further passed through an ultraviolet irradiator 132, ultraviolet rays are applied to the optical fiber, the coating layer is formed, and then the optical fiber 1 is formed. Note that, the coating layer is typically formed of two layers. In the case of forming a two-layer coating layer, after the optical fiber is covered with ultraviolet curable resins forming the respective layers, the ultraviolet curable resins are cured at one time, and then the two-layer coating layer can be formed. Alternatively, after forming a first coating layer, a second coating layer may be formed. The direction of the optical fiber 1 is changed by a turn pulley 141, and then the optical fiber 1 is wound on a reel 142.

The present invention is not limited to the one or more embodiments described above. That is, the optical fiber production method according to one or more embodiments of the present invention only has to include the drawing process and the slow cooling process described above. The precooling process and the rapid cooling process are not essential processes. The optical fiber production method according to one or more embodiments of the present invention is applicable to the manufacture of any types of optical fibers. For example, the optical fiber production method according to one or more embodiments of the present invention is applicable also to production methods for optical fibers having different materials, such as chalcogenide glass and fluorine glass, as a principal component, as well as production methods for optical fibers having silica glass as a principal component, if the constant A and the activation energy $E_{act}$ in Equation (5) above are derived.

According to one or more embodiments of the present invention, there is provided an optical fiber production method with which an optical fiber with decreased transmission losses can be manufactured, and the method can be used in the field of optical fiber communications. The method can also be used for optical fiber production methods for use in fiber laser devices and other devices using optical fibers.

REFERENCE SIGNS LIST

1 . . . optical fiber
1P . . . optical fiber preform
110 . . . drawing furnace
111 . . . heating unit
120 . . . tubular product
121 . . . annealing furnace
122 . . . cooling device
131 . . . coater
132 . . . ultraviolet irradiator
141 . . . turn pulley
142 . . . reel
P1 . . . drawing process
P2 . . . precooling process
P3 . . . slow cooling process
P4 . . . rapid cooling process Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical fiber production method comprising:
drawing an optical fiber from an optical fiber preform in a drawing furnace; and
cooling the optical fiber, wherein
in the cooling process, the optical fiber is passed through a plurality of annealing furnaces,
Equation (1) is held for a predetermined period in the cooling process, where
a time constant of relaxation of a structure of glass forming a core included in the optical fiber is defined as $\tau(T_n)$,
a temperature of the optical fiber at a point in time when the optical fiber is delivered into an nth annealing furnace from an upstream side in the cooling process is defined as $T_n$,
a fictive temperature of glass forming the core at the point in time when the optical fiber is delivered into the nth annealing furnace from the upstream side is defined as $T_{fn}$, and
a fictive temperature of glass forming the core after a lapse of time $\Delta t$ from the point in time when the optical fiber is delivered into the nth annealing furnace from the upstream side is defined as $T_f$ $$20°\ C. < T_f - T_n = (T_{fn} - T_n)\exp(-\Delta t/\tau(T_n)) < 100°\ C. \qquad (1),$$

a temperature difference between a preset surface temperature of a downstream annealing furnace of the plurality of annealing furnaces and a fictive temperature of glass forming the core at an inlet port of the downstream annealing furnace is smaller than a temperature difference between a preset surface temperature of an upstream annealing furnace of the plurality of annealing furnaces and a fictive temperature of glass forming the core at an inlet port of the upstream annealing furnace,
the downstream annealing furnace is disposed farther from the drawing furnace than the upstream annealing furnace, and
the preset surface temperature of the upstream annealing furnace is higher than the preset temperature of the downstream annealing furnace.

2. The optical fiber production method according to claim 1, wherein Equation (2) is held for a predetermined period in the cooling process.

$$40° C. < T_f - T_n = (T_{fn} - T_n)\exp(-\Delta t/\tau(T_n)) < 60° C. \quad (2)$$

3. The optical fiber production method according to claim 1, wherein Equation (3) is held and a preset surface temperature of the nth annealing furnace is defined as $T_{sn}$.

$$20° C. < T_{fn} - T_{sn} < 100° C. \quad (3)$$

4. The optical fiber production method according to claim 3, wherein Equation (4) is held.

$$40° C. < T_{fn} - T_{sn} < 60° C. \quad (4)$$

5. The optical fiber production method according to claim 1, wherein
the optical fiber is in any one of the plurality of annealing furnaces when a temperature of the optical fiber is in a range of 1,300° C. or more and 1,500° C. or less.

* * * * *